Figure 1:
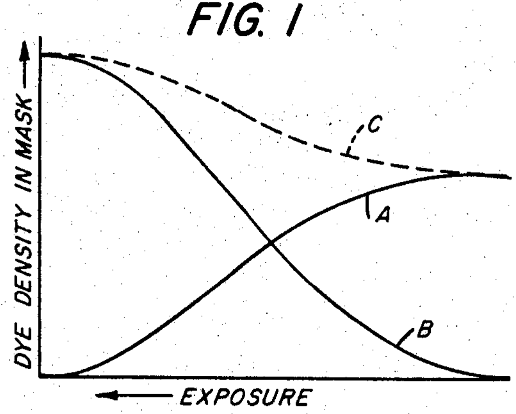

Nov. 19, 1968 R. A. MOONEY ET AL 3,411,905

PHOTOGRAPHIC MASKING PROCESS

Filed June 14, 1965 2 Sheets-Sheet 1

ROBERT A. MOONEY
CLARENCE N. NELSON
WARREN A. SHELTON
INVENTORS

BY R. Frank Smith
Roy Carter Livermore

ATTORNEY & AGENT

PHOTOGRAPHIC MASKING PROCESS

Filed June 14, 1965 2 Sheets-Sheet 2

ROBERT A. MOONEY
CLARENCE N. NELSON
WARREN A. SHELTON
INVENTORS

BY R. Frank Smith
Ray Carter Livermore

ATTORNEY & AGENT 3,411,905

PHOTOGRAPHIC MASKING PROCESS

Robert A. Mooney, Clarence N. Nelson, and Warren A. Shelton, Rochester, N.Y., assignors to Eastman Kodak Company, Rochester, N.Y., a corporation of New Jersey Filed June 14, 1965, Ser. No. 463,786
8 Claims. (Cl. 96—5)

This invention relates to photographic printing. In a more specific aspect, this invention concerns novel methods of printing extended-scale negatives onto variable-contrast photographic materials, and masks for use in such methods.

In printing extended-scale intermediate images such as photographic negatives, onto reflection-copy materials, it is difficult to obtain sharp rendition of details and adequate contrast in both the shadows and the highlights of the scene because of the relatively short exposure latitude and density scale of photographic papers. A substantial improvement in photographic quality in the highlight and shadow areas can be achieved by using an unsharp positive mask in unsharp printing relationship to the negative, in order to lower the overall contrast of the reproduction without reducing the microscale (i.e., fine-detail) contrast.

Unsharp masking is of particular benefit in printing negatives onto frequency-sensitive, variable-contrast papers of the type which comprises two silver halide components sensitive to different regions of the spectrum, one component providing high-contrast and the other low-contrast response. One form of frequency-sensitive, variable-contrast photographic paper, for example, comprises a mixture of high-contrast, blue sensitive emulsion and a lower-contrast, green-sensitive emulsion. Exposure with predominantly blue light produces a hard or contrasty reproduction, with predominantly green light, a softer reproduction; mixtures of blue and green light produce intermediate degrees of contrast. Appropriate color filters are used to control the contrast by changing the spectral quality of the exposing light from predominantly blue to predominantly green.

Positive unsharp monochrome masks of a color which transmits the light to which the higher contrast of the two components of the variable-contrast paper, is sensitive, and absorbs the light to which the lower contrast component is sensitive, have been used in combination with contrast-controlling color filters. This combination has proven to be of advantage in improving highlight and shadow rendition and in accommodating negatives of considerable density range on short-scale papers, but the contrast-controlling filters are expensive and their use lowers the effective speed of the print material and increases the possibility of exposure errors.

A much more serious disadvantage from the use of such filters in combination with monochrome unsharp masks lies in their undesirable property of spectrally absorbing a part of the exposing light uniformly across the entire tonal range of the image which is to be reproduced. A yellow filter, for example, would be opaque to the blue portion of the printing light, not only in the highlight, i.e., dark, areas of the intermediate negative where absorption of the blue is desired, but also in the shadow areas where blue light is needed for exposing the blue-sensitive, high-contrast component of the variable-contrast print material.

We have found a new method of unsharp masking using two-colored masks, which markedly extends the advantages of unsharp masking in printing extended scale negatives onto variable-contrast materials, and in addition obviates the usual contrast-controlling filters.

It is an object of our invention to provide a novel two-colored unsharp photographic mask for use in printing negatives of extended density scale onto frequency-sensitive, variable-contrast photographic materials which mask precludes separate contrast-controlling filters and accomplishes an unprecedented simultaneous increase in the detail contrast of the shadows and highlights of the reproduction relative to the overall contrast.

It is another object to provide a novel process for printing intermediate images onto frequency-sensitive, variable-contrast photographic papers, which employs in unsharp masking relationship to the intermediate image, a novel two-colored photographic unsharp mask which selectively modifies the spectral quality of the printing light over the full range available, in accordance with the tone reproduction scale of the intermediate image.

It is another object of our invention to provide a novel process for printing photographic negatives onto frequency-sensitive, variable-contrast materials, in which the printing light is modulated automatically in such a manner that light of predominantly one portion of the spectrum prints the relatively low density or shadow portions of said image, and that light of predominantly another portion of the spectrum prints the relatively high density or highlight areas of said image.

These and other objects of our invention are accomplished with image-forming materials which enable the preparation of multicolored unsharp masks from the intermediate images, and by the use of such unsharp masks in unsharp masking relationship with the intermediate transparency for printing onto frequency-sensitive variable-contrast photographic materials.

Our invention comprises the preparation and use of a two-colored unsharp photographic mask for the improvement of photographic reproductions printed on variable-contrast print materials. Our masks automatically form in an imagewise manner a continuously variable pair of printing filters which serve in cooperation with the variable-contrast print materials. The masking materials of our invention can be of the print-out or developing-out types. Our masks are prepared by exposing the masking material through the intermediate images to be masked in unsharp masking relationship and, in the case of the developing-out type, processing them to render the recorded images visible.

The masks of our invention are used in unsharp masking relationship to the intermediate image to be recorded on variable-contrast photographic positive reflection-type materials. A mask of our invention constitutes an integral, continuously-variable pair of colored images of different maximum densities, one such image being negative, the other being positive with respect to the image of the intermediate to be printed. One image of our mask is of a color which transmits light of that portion of the spectrum to which the high-contrast component of the variable-contrast print material is sensitive and absorbs light to which the low-contrast component of the variable-contrast print material is sensitive. The other image of our mask is of a color which transmits light of that portion of the spectrum to which the low-contrast component of the variable-contrast print material is sensitive, and absorbs light to which the high-contrast print material is sensitive. By virtue of having different maximum densities and different spectral absorption characteristics, the masks of our invention provide an automatic, simultaneous combination of density, contrast and spectral control of the printing process. As a result of the cooperation between our mask and the variable-contrast print material, our printing process produces excellent rendition of fine details throughout the entire tonal range of a photographic reproduction, even in the shadow and highlight areas where the fine details cannot be reproduced by prior art reproduction processes.

An advantageous form of the unsharp masks of our invention comprises an integral combination of two images of different colors, one being positive, the other negative with respect to the original scene. In order for such a mask to remain effective in lowering the macro (i.e., overall) contrast of the image to be masked, the combined densities of its two colored images should form a mask that is positive with respect to the original image. One image of our mask is therefore of a color of relatively high max density to the light to which the low contrast component of the print material is sensitive, while the other image of our mask is of a color of relatively low max density to the light to which the high contrast component of the print material is sensitive.

It is this integral pairing of a negative and a positive masking image which distinguishes the masks of our invention from conventional colored masks requiring the use of separate contrast-controlling filters, and which affords an improved reproducibility of highlight as well as shadow details of the original scene. A replacement of the variable-density negative image of our mask by a conventional contrast-controlling filter of like color, yellow, for example, placed in the path of the printing light would reduce the sharpness of fine details in either the highlight or the shadow regions of the reproduction. Since the spectral density of such a filter would extend uniformly across the entire tonal range of the scene, there would be too much absorption of blue light, for example, in the shadow region where blue light is needed for exposing the high-contrast component of the print material. Also, by depriving the exposing light of an undesirably high quantity of its blue component in the shadow areas, such a filter would cause fine details in these areas partly to be recorded on lower contrast components of the print material with a concomitant loss in sharpness of these details in the reproduction. An attempt to compensate for this loss of blue light in the shadow areas by increasing the intensity of the printing light, would cause an overexposure in the highlight areas and, consequently, a degradation of the image contrast in these areas.

The two-color masks useful in our process for printing onto variable-contrast photographic papers can be made by a variety of color-image-forming systems. These include, for example, systems using certain organic azido compounds with certain heterocyclic couplers, systems that use certain azido compounds with primary aromatic amine color developing agents and colored color-forming couplers, systems using certain aromatic azido compounds which upon photolysis couple with colored-color-forming couplers present, the azo dye bleach process, the development process involving oxidative coupling of primary aromatic amine developing agent with couplers, dye mordanting process, chemical toning and others. The images can be formed by processes that involve exposure only, i.e., so-called printout processes, or by processes that involve exposure and wet processing. The images can be formed by conversion of a compound of one color to a compound of another color so that a negative image of the first color and a positive image of the second color are obtained, as the two color images are printed out or developed up in distinct light-sensitive elements which can be in the same or separate layers. Hybrid systems can be used in which, for example, the positive image is produced by one process and the negative image, by a second different process. For example, light-sensitive silver halide emulsion layers coated on opposite sides of a common transparent base can be color developed, one to a negative colored mask of appropriate contrast by azo dye bleach, the other to a positive colored mask of appropriate contrast with oxidative coupling development. (There is no resolution problem from having the two images on opposite sides of the support because of the unsharpness necessary for all of these images produced.) An unsharp two-colored mask according to our invention can also be prepared by differentially toning each of two imagewise exposed and processed photographic emulsion layers coated on opposite sides of a common transparent base. Such a method includes a material comprised of a negative emulsion layer on one side of the base and a direct positive emulsion layer on the opposite side of the support. One such layer, upon unsharp exposure to the intermediate transparency and its subsequent processing, is toned to give an image of a first color, the other such layer, upon the same exposure and processing as above, is toned to give an image of a second color.

Included among the mask image color combinations with the spectral sensitivities of the two emulsion components of the variable-contrast print materials used to advantage are those shown below.

| Two-colored Mask Material | | Spectral Sensitivity of Silver Halide Emulsions in Variable Contrast Material | |
|---|---|---|---|
| Color of Positive Mask | Color of Negative Mask | High Contrast | Low Contrast |
| magenta | yellow | blue | green |
| blue | yellow | blue | green |
| blue | green | blue | green |
| blue | red | blue | red |
| green | red | green | red |
| green | blue | green | blue |
| red | blue | red | blue |
| red | green | red | green |
| yellow | magenta | green | blue |
| yellow | cyan | red | blue |
| magenta | cyan | red | green |
| cyan | yellow | blue | red |
| cyan | magenta | green | red |
| yellow | blue | green | blue |
| orange | cyan | red | blue |
| blue | magenta | blue | red |
| blue | cyan | blue | green |
| green | yellow | green | red |
| green | magenta | green | red |
| green | cyan | green | blue |
| red | yellow | red | green |
| red | magenta | red | blue |
| red | cyan | red | blue |
| magenta | blue | red | blue |
| cyan | blue | green | blue |
| yellow | green | red | green |
| magenta | green | red | green |
| cyan | green | blue | green |
| yellow | red | green | red |
| magenta | red | blue | red |
| cyan | red | blue | red |

The following examples will serve to further illustrate the unsharp masking process of our invention.

EXAMPLE 1

A print-out masking material was made as described. Forty grams of 2-azido-1-carbobutoxymethylcarbamylbenzimidazole and four grams of benzo[a]phenothiazine were dissolved in a dope consisting of 70 grams of cellulose acetate and 330 gm. of acetone. The solution was filtered and subjected to suction in order to remove dissolved air. The resulting yellow material was coated onto an 0.008 inch poly(ethylene terephthlate) support by means of an extrusion hopper to a dry coverage of 1.5 gm./ft.$^2$. The coating was then exposed to ultraviolet radiation through a step tablet to produce a printout image which had a contrast of 0.5 measured through a Wratten 38A cyan filter. Lower or higher contrasts were obtained by either decreasing or increasing the coating coverage of the material.

The following example will illustrate the use of the masking material made in Example 1.

EXAMPLE 2

A black-and-white aerial negative having a large density range and considerable important detail in the low, medium and high density areas could not be printed to provide an acceptable reproduction on a reflection type material without the use of some dodging technique. A positive unsharp mask of the negative was made by placing a sheet of unexposed mask material prepared according to Example 1 in contact with the negative, base-to-base, and exposing it through the negative to a source of ultraviolet radiation. After the mask was printed, the sandwich of mask and negative were held in register and printed with unfiltered tungsten light onto "Polycontrast" paper. Excellent prints resulted which had fine detail well produced throughout the tonal range. Masked prints were also made on a single-contrast paper, Grade 2. The prints had noticeably lower quality than those made on the variable contrast paper although they were better than the prints made without a mask.

EXAMPLE 3

Pale yellow colored masking materials are made to advantage as in Example 1 using about forty grams of 2 - azido - 1 - carbobutoxymethylcarbamylbenzimidazole and about four grams of benzo[c]phenothiazine. This mask gives a green-colored image in areas exposed to ultraviolet radiation. Unsharp masks made as in Example 2 are used to advantage to print on variable contrast print material which has a high contrast silver halide component that is sensitive only to red light and a low contrast silver halide component that is sensitive only to green light. Excellent prints are obtained as in Example 2.

EXAMPLE 4

Example 3 is repeated but substituting 2-methoxy-6-chloro-9-azidoacridine and benz[phenoxazine for the azido compound and coupler of Example 3. This mask is also pale yellow in color and forms a green image upon printout. Unsharp masks are used to advantage as described in Example 3 giving excellent prints similar to those obtained in Example 2.

EXAMPLE 5

Pale pink colored masking materials that produce blue-colored printout images are produced to advantage by coating according to the procedure used in Example 1 a mixture of 3 - isopropoxyphenothiazine (4 g.) and 2 - azidobenzoxazole (40 g.), or a mixture of 3-isopropoxyphenothiazine (4 g.) and 2 - azido - 1-phenylcarbamylbenzimidazole (40 g.), or 1 - methoxyphenothiazine (4 g.) and 2 - azido - 1 - phenylcarbamylbenzimidazole (40 g.). Unsharp masks made of an aerial negative such as described in Example 2 are used to advantage to print excellent reproductions of the negative on variable contrast paper in which the high contrast component is red-sensitive and the low contrast component is blue-sensitive.

The above and other azido and coupler compounds that are used to advantage in making masking materials that are valuable for our printing process are described in copending Sagura et al. U.S. Ser. No. 227,561, filed Oct. 1, 1962.

In another embodiment of our invention the unsharp mask can be prepared by the print-out methods disclosed in U.S. Patent 3,062,650, issued Nov. 6, 1962. These print-out materials have a light-sensitive layer that contains a colored, color-forming coupler and an azide derived from a *p*-phenylenediamine color developing agent. In light-exposed areas the photolized azide releases oxidized developing agent which reacts with the coupler changing it from its initial color to the color of its dye. Included among the large number of colored color-forming couplers that are used to advantage are the following:

| Coupler No. | Name |
|---|---|
| 1 | 1 - phenyl - 3 - (3 - sulfobenzamido) - 4 - (4 - octadecyloxyphenylazo)-5-pyrazolone |
| 2 | 1 - phenyl - 3 - (3,5 - disulfobenzamido) - 4 - (4-octadecyloxyphenylazo)-5-pyrazolone |
| 3 | 1 - hydroxy - 4 - (2 - *n* - amylcarbonyl - 3 - naphthylazo)-N-[β-(3-sulfobenzamido)ethyl]-2-naphthamide |
| 4 | 4 - (p - hydroxyphenylazo) - 3 - methyl - 1 - phenyl-5-pyrazolone |
| 5 | 4 - [p - methoxyphenylazo] - 1 - hydroxynaphthol |
| 6 | 5 - (3 - carboxy - 2 - propylphenylazo) - 8 - hydroxyquinoline |
| 7 | α-(2,4-dinitrophenylazo)-α-benzoylacetanilide |
| 8 | 1-hydroxy-4-(2-acetylphenylazo)-2-naphthanilide |
| 9 | 1 - hydroxy - 4 - (2 - acetylphenylazo) - N - [δ - 2,4-di-tert-amylphenoxy)butyl]-2-naphthamide |
| 10 | 1 - hydroxy - 4 - (3 - carbododecoxy - 2 - naphthylazo)-N-[δ-(2,4-diamylphenoxy)butyl]-2-naphthamide |

The yellow-colored magenta-forming couplers 1 and 2, and the yellow-colored cyan-forming coupler 3 are described in U.S. Patent 2,852,370. Yellow-colored magenta-forming coupler 4, red-colored blue-forming coupler 5, red-colored cyan-forming coupler 6, and orange-red-colored yellow-forming coupler 7 are described in U.S. Patent 2,449,996. Couplers 8, 9 and 10 are magenta-colored cyan-forming couplers that are disclosed in U.S. Patent 3,034,892.

EXAMPLE 6

Magenta-colored masking materials that produce cyan-colored printout images are produced to advantage by coating on a transparent support, a poly(vinylbutal) and alcohol dope containing a mixture of 2-methyl-4-diethylaminophenyl azide hydrochloride (2 moles) and 1 mole of the magenta-colored cyan-forming coupler 1-hydroxy-4 - (2 - acetylphenylazo) - 2 - naphthanilide with a slight excess of triethylamine (to effect solution of the azide as the free base). Unsharp masks are made to advantage of aerial negatives such as are described in Example 2 with these materials to print excellent reproductions of the negative on variable contrast paper in which the high contrast component is red-sensitive and the low contrast component is green-sensitive.

In still another embodiment of our invention the unsharp mask can be prepared by using a developing-out silver halide emulsion layer containing an incorporated colored color-forming coupler such as those described previously. After image exposure the mask is prepared by conventional color processing in which a silver and dye image is developed with an aqueous alkaline solution of a primary aromatic color developing agent and then subsequently the silver and residual silver halide are removed by bleaching and fixing. The processed and dried mask is then placed in register and in unsharp masking relation with the negative for exposing the print material.

Any of the usual equipment and techniques used to make unsharp masks can be used to advantage in our process and need not be described further here.

Figure 2:
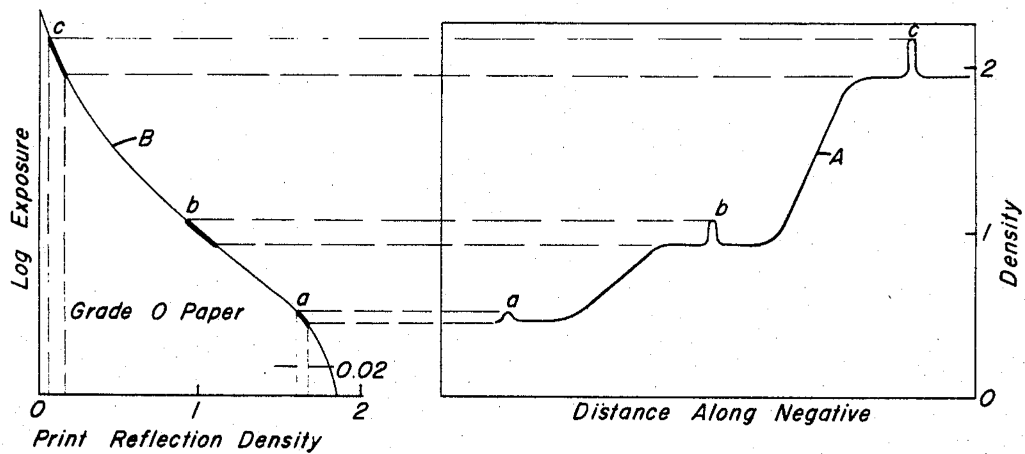
Figure 3:
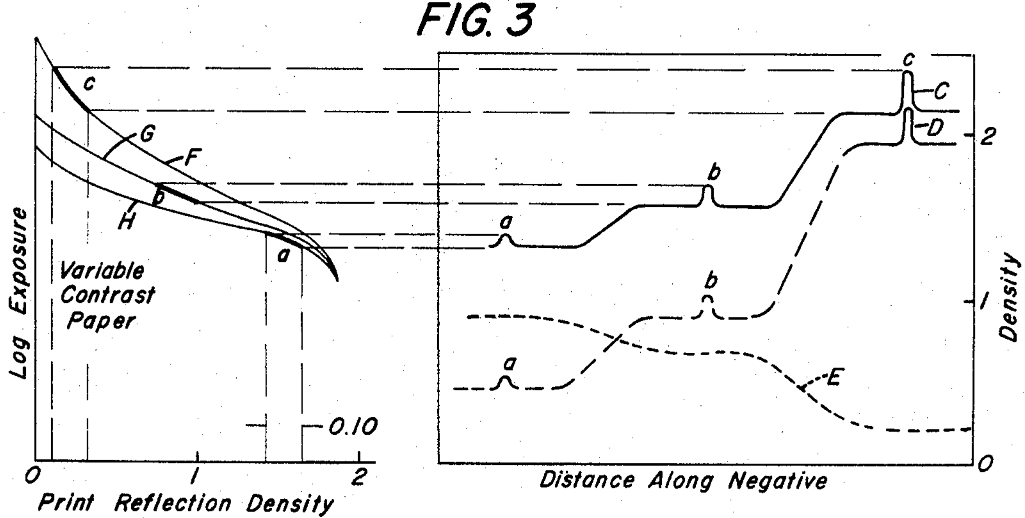

The accompanying drawings, FIGS. 1, 2 and 3, still further illustrates our invention.

FIG. 1 shows the dye density curves vs. exposure for one of our masking materials. Curve A shows how the yellow-colored (negative) printing filter varies with exposure and Curve B shows how the magenta colored (positive) printing filter simultaneously varies with exposure. Curve C shows that the combined densities of Curves A and B produces a positive mask (relative to the original scene). This drawing shows that in the highlight areas of the negative which correspond to the shadow areas of the original scene, the blue light needed to print the fine detail of the negative in the variable-contrast print paper is not obscured by the yellow filter Curve A which has substantially no density in that region of the mask.

FIG. 2 shows how a negative image represented by Curve A (density vs. distance along negative) having image details "a," "b" and "c" in the negative highlight, middletone and shoulder density levels respectively (corresponding to shadow areas, areas of average light intensity and very brightly lighted areas in the original, respectively) is reproduced on a print material having Curve B (log exposure vs. print reflection density). It can be seen that the image detail "a" in the negative Curve A is recorded as a 0.02 density range on the reflection print made on grade 0 paper. This 0.02 density difference in the shadow region "a" of the print is much less than it should be for useful reproduction of the original scene.

FIG. 3 shows how the negative image represented by Curve D (identical to Curve A in FIG. 2) is masked with our two-color unsharp mask represented by Curve E which is magneta-colored in the negative highlight area, magenta- and yellow-colored in the negative middletone area, and yellow-colored in the negative shoulder area, to produce the masked negative Curve C which is reproduced on a variable contrast paper print material having a high contrast blue-sensitive silver halide emulsion component represented by sensitometric curve H and a low contrast green-sensitive silver halide emulsion component represented by sensitometric Curve F. Curve G represents the log exposure vs. reflection density curve that is obtained by exposing with blue-green light. It can be seen that image detail "a" is reproduced as a 0.10 density range on the reflection print made on the variable contrast paper. This density range gives good detail reproduction in the shadow areas of the print. Similarly, it can be seen that the print reflection density range reproduction of detail "c" in masked negative Curve C of FIG. 3 is good while the corresponding reproduction in FIG. 2 from the unmasked negative Curve A detail "c" is very poor because of the compression of the density range.

Similarly the advantages in our masking process illustrated in the drawings for a magneta- and yellow-colored unsharp mask with the variable contrast print paper having a high contrast blue-sensitive component and a low contrast green-sensitive component, can also be shown for masks of other colors used with a variable contrast print material having the appropriate optical sensitization of the two emulsion components.

Our two-color unsharp mask printing process provides a technical advance over other mask printing processes. The cooperation between our unsharp two-color mask which serves as an automatic continuously variable pair of printing filters and the variable contrast printing paper results in a process which reduces the macro contrast of the negative image and gives excellent detail reproduction in the shadow area as well as the highlight area of the print. Our process is valuable for use in the field of aerial photography as well as in other areas, such as, the printing of x-ray negatives, in press photography, in commerical-advertising photography, etc., because it provides a very effective means of compensating for the loss in detail print reproduction, especially in the shadow areas caused by atmospheric haze, stray x-ray radiation, camera flare light, etc.

The invention has been described in detail with particular reference to preferred embodiments thereof but it will be understood that variations and modifications can be effected within the spirit and scope of the invention as described hereinabove and as defined in the appended claims.

We claim:

1. A photographic printing process for automatically extending the fine detail print reproduction from a negative simultaneously into both the under- and over-exposed areas of the said negative in addition to lowering the macro contrast of the negative without lowering the micro contrast of the negative, said process comprising the steps of:

(1) producing a two-colored unsharp mask of said negative, said mask automatically forming in an imagewise manner a continuously variable pair of printing filters one of said filters being positive and the other negative, and (2) exposing a variable-contrast reflection type photographic element to light through the said negative and the said mask in unsharp printing relationship, said element having a high contrast emulsion that responds to light transmitted by only one of the said variable pair of printing filters and a low contrast emulsion that responds only to light transmitted by the other of the said variable pair of printing filters.

2. A photographic printing process for automatically extending the fine detail print reproduction from a negative simultaneously into both the under- and over-exposed areas of the said negative in addition to lowering the macro contrast of the negative without lowering the micro contrast of the negative, said process comprising the steps of:

(1) producing a two-colored unsharp mask of said negative by exposing a masking material to activating light through the said negative in unsharp masking relationship and where the said mask image is not produced by print-out, photographically processing the said exposed material to produce the said two-colored unsharp mask comprising a continuously variable pair of printing filters, and (2) exposing a variable-contrast reflection type photographic element to light through the said negative and the said mask in unsharp printing relationship, said element having a high contrast emulsion that responds to light transmitted by only one of the said variable pair of printing filters and a low contrast emulsion that responds only to light transmitted by the other of the said variable pair of printing filters.

3. A photographic printing process for automatically extending the fine detail print reproduction from a negative simultaneously into both the under- and over-exposed areas of the said negative in addition to lowering the macro contrast of the negative without lowering the micro contrast of the negative, said process comprising the steps of:

(1) producing a two-colored unsharp mask of said negative by exposing a print-out masking material to ultraviolet light through the said negative in unsharp masking relationship to produce a two-colored mask comprising a continuously variable pair of printing filters, and (2) exposing a variable-contrast reflection type photographic element to light through the said negative and the said mask in unsharp printing relationship, said element having a high contrast emulsion that responds to light transmitted by only one of the said variable pair of printing filters and a low-contrast emulsion that responds only to light transmitted by the other of the said variable pair of printing filters.

4. A photographic printing process for automatically extending the fine detail print reproduction from a negative simultaneously into both the under- and over-exposed areas of the said negative in addition to lowering the macro contrast of the negative without lowering the micro contrast of the negative, said process comprising the steps of:

(1) producing an unsharp mask of said negative by exposing a pale yellow-colored magenta-forming print-out material to ultraviolet light through the said negative in unsharp masking relationship to produce continuously variable yellow and magenta-colored filters such that the yellow density is inversely proportional to the amount of light exposure and the amount of magenta density is directly proportional to the amount of light exposure and such that the combined densities of the said filters form a positive mask, and (2) exposing a variable-contrast reflection type photographic element to light through the said negative and the said unsharp mask in unsharp printing relationship said element having a high contrast silver halide emulsion that responds only to light transmitted by the magenta-colored filter and a lower contrast silver halide emulsion that responds only to light transmitted by the yellow-colored filter.

5. A photographic printing process for automatically extending the fine detail print reproduction from a negative simultaneously into both the under- and over-exposed areas of the said negative in addition to lowering the macro contrast of the negative without lowering the micro contrast of the negative, said process comprising the steps of:

(1) producing an unsharp mask of said negative in a yellow-colored magenta-forming print-out material having a transparent support coated with a print-out layer containing 2-azido-1-carbobutoxymethylcarbamylbenzimidazole and benzo[a]phenothiazine, by exposing said print-out material to ultraviolet light through the said negative in unsharp masking relationship to produce a magenta-colored positive mask and a yellow-colored negative mask such that the combined masks form a positive mask, and (2) exposing a variable-contrast reflection type photographic element to light through the said negative and the said unsharp mask in unsharp printing relationship, said element having a high contrast silver halide emulsion that responds only to blue light and a low contrast silver halide emulsion that responds only to green light.

6. A photographic printing process for automatically extending the fine detail print reproduction from a negative simultaneously into both the under- and over-exposed areas of the said negative in addition to lowering the macro contrast of the negative without lowering the micro contrast of the negative, said process comprising the steps of:

(1) producing an unsharp mask of said negative in a pale yellow-colored green-forming printout material having a transparent support coated with a printout layer containing 2-azido-1-carbobutoxymethylcarbamylbenzomidazole and benzo[c]phenothiazine by exposing said printout material to ultraviolet light through the said negative in unsharp masking relationship to produce a green-colored positive mask and a yellow-colored negative mask such that the combined masks form a positive mask, and (2) exposing a variable contrast reflection type photographic element to light through the said negative and the said unsharp mask in unsharp printing relationship, said element having a high contrast silver halide emulsion that responds only to red light and a low contrast silver halide emulsion that responds only to green light.

7. A photographic printing process for automatically extending the fine detail print reproduction from a negative simultaneously into both the under- and over-exposed areas of the said negative in addition to lowering the macro contrast of the negative without lowering the micro contrast of the negative, said process comprising steps of:

(1) producing an unsharp mask of said negative in a pale pink-colored blue-forming printout material having a transparent support coated with a printout layer containing 2 - azidobenzoxazole and 3 - isopropoxyphenothiazine by exposing said printout material to ultraviolet light through the said negative in unsharp masking relationship to produce a blue-colored positive mask and a pink-colored negative mask such that the combined masks form a positive mask, and (2) exposing a variable contrast reflection type photographic element to light through the said negative and the said unsharp mask in unsharp printing relationship, said element having a high contrast silver halide emulsion that responds only to red light and a low contrast silver halide emulsion that responds only to blue light.

8. A photographic printing process for automatically extending the fine detail print reproduction from a negative simultaneously into both the under- and over-exposed areas of the said negative in addition to lowering the macro contrast of the negative without lowering the micro contrast of the negative, said process comprising the steps of:

(1) producing an unsharp mask of said negative in a magenta-colored cyan-forming printout material having a transparent support coated with a printout layer containing a mixture of 2 - methyl-4 - diethylaminophenyl azide (2 moles), and 1-hydroxy-4-(2-acetylphenylazo) - 2 - naphthanilide (1 mole) by exposing said printout material to ultraviolet light through the said negative in unsharp masking relationship to produce a cyan-colored positive mask and a magenta-colored negative mask such that the combined masks form a positive mask, and (2) exposing a variable contrast reflection type photographic element to light through the said negative and the said unsharp mask in unsharp printing relationship, said element having a high contrast silver halide emulsion that responds only to red light and a low contrast silver halide emulsion that responds only to green light.

References Cited

UNITED STATES PATENTS

| | | | |
|---|---|---|---|
| 2,455,849 | 12/1948 | J. A. C. Yule | 96—44 |
| 2,737,457 | 3/1956 | C. Childress | 96—27 |
| 2,848,326 | 8/1958 | K. E. Whitmore | 96—44 |
| 3,127,268 | 3/1964 | E. Hellmig | 96—27 |
| 3,282,693 | 11/1966 | Sagura et al. | 96—49 |
| 3,062,650 | 11/1962 | Sagura et al. | 96—90 |

NORMAN G. TORCHIN, *Primary Examiner.*

G. COHN, *Assistant Examiner.*